United States Patent

Weitzsch

[15] 3,689,689

[45] Sept. 5, 1972

[54] CIRCUIT ARRANGEMENT FOR COLOR POINT ADJUSTMENT

[72] Inventor: Fritz Weitzsch, Hamburg, Germany

[73] Assignee: U.S. Philips Corporation, New York, N.Y.

[22] Filed: March 5, 1970

[21] Appl. No.: 16,781

[30] Foreign Application Priority Data

March 7, 1969 Germany..........P 19 11 686.0

[52] U.S. Cl...........................178/5.2 R, 178/5.4 HE

[51] Int. Cl...............................................H04n 9/02

[58] Field of Search..................178/5.2, 5.4, 5.4 HG

[56] References Cited

UNITED STATES PATENTS

| | | | |
|---|---|---|---|
| 2,888,514 | 5/1959 | Pritchard | 178/5.4 |
| 3,536,827 | 10/1970 | Bell | 178/5.4 HE |

*Primary Examiner*—Richard Murray
*Attorney*—Frank R. Trifari

[57] ABSTRACT

Circuits for modifying either transmitted or received color signals feature at the transmitter, means for adding selected portions of the blue and red signals to the luminance signal before matrixing it to form the color difference signals. At the receiver, the blue and red color signals are applied to a generated green color difference signal. This enables certain colors to be varied without effecting other colors.

10 Claims, 16 Drawing Figures

Figure 1:
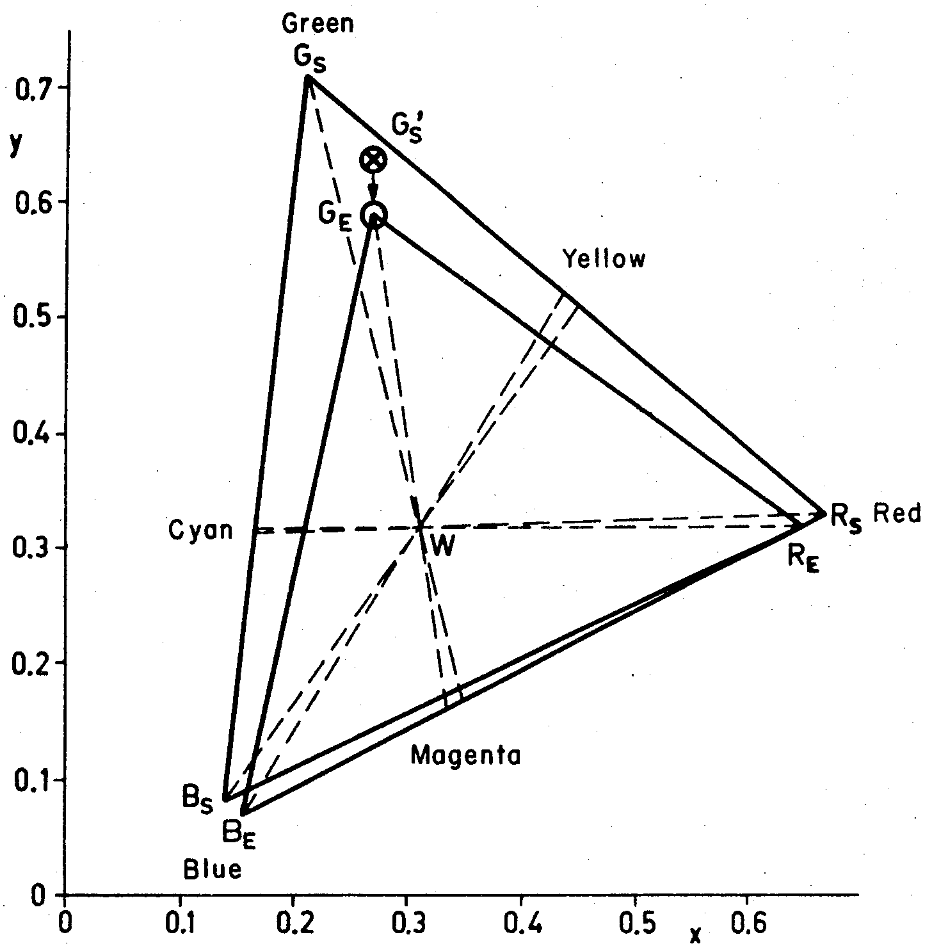

*INVENTOR.*
FRITZ WEITZSCH
*BY*
AGENT

INVENTOR.
FRITZ WEITZSCH
BY
AGENT

INVENTOR.
FRITZ WEITZSCH
BY
[signature]
AGENT

INVENTOR.
BY FRITZ WEITZSCH
AGENT

INVENTOR.
FRITZ WEITZSCH
BY Frank R. [signature]
AGENT

INVENTOR.
FRITZ WEITZSCH
BY
Frank R. Trifari
AGENT

INVENTOR.
FRITZ WEITZSCH
BY
Frank R. Trifari
AGENT

*INVENTOR.*
FRITZ WEITZSCH
BY
[signature]
AGENT

INVENTOR.
FRITZ WEITZSCH
BY
AGENT

INVENTOR.
FRITZ WEITZSCH
BY
AGENT

INVENTOR.
FRITZ WEITZSCH
BY
[signature]
AGENT

CIRCUIT ARRANGEMENT FOR COLOR POINT ADJUSTMENT

The invention relates to a circuit arrangement for correction of the chromaticity of a color television display by means of electrical color signals obtained from an image pick up device, from which color signals a luminance signal and two color difference signals are formed in a transmitter matrix and from which signals a third color difference signal is recovered in a receiver matrix.

In known circuit arrangements of this kind simple T-sections are generally used for correction in which the white point is not held constant with sufficient accuracy in case of a variation for the purpose of correction.

Further, when a chromaticity correction, for example, of the skin color must be carried out in color television at the transmitter end, for example, for the elimination of color film errors the desired improvement is achieved but is accompanied by other color errors such that only an incomplete compromise is obtained.

Differences between the fixed NTSC-color valences and the color valences of the luminescent materials currently used for picture display tubes become manifest as errors in hue, saturation and luminance at the display end; thus also in this case a correction possibility is essential.

It is a purpose of the invention to avoid this disadvantage.

According to one aspect of the invention a circuit arrangement is provided for correction of the chromaticity of a color television display by means of electrical color signals obtained from an image pick up device, from which color signals a luminance signal ($U_{YS}$) and two color difference signals ($U_{(R-Y)S}$ and $U_{(B-Y)S}$) are formed in a transmitter matrix and of from which color signals a third color difference signal ($U_{(G-Y)S}$) is recovered in a receiver matrix, characterized in that for varying the color of the skin in case of substantially unchanged white point and green intensity adjustable and oppositely equally large fractions ($+Y_{GSo} \cdot g_s \cdot U_{RS}$ and $-Y_{GSo} \cdot g_s \cdot U_{BS}$) which are proportional to the color signals ($U_{RS}$ and $U_{BS}$) to be transmitted are added to or subtracted from the luminance signal ($U_{YS}$) formed in the transmitter matrix and/or that oppositely equally large fractions ($-g \cdot U_{R-Y)S}$ and $+g \cdot U_{(B-Y)S}$ ) of the two transmitted color difference signals which fractions are adjustable in magnitude and sign are added to or subtracted from the third color difference signal ($U_{(G-Y)S}$) recovered in the receiver matrix by combination of the transmitted color difference signals ($U_{(R-Y)S}$ and $U_{B-Y)S}$).

According to another aspect of the invention a circuit arrangement is provided for adjusting the correction of the chromaticity of a color television display by means of electrical color signals obtained from an image pick up device, from which color signals a luminance signal ($U_{YS}$) and two color difference signals ($U_{(R-Y)S}$ and $U_{(B-Y)S}$) are formed in a transmitter matrix and from which color signals a third color difference signal ($U_{(G-Y)S}$) is recovered in a receiver matrix, characterized in that for reducing the green intensity in case of substantially unchanged reproduction of the skin color and white an adjustable portion ($h_s \cdot Y_{GS} \cdot U_{GS}$) which is proportional to the G-signal is subtracted from the luminance signal ($U_{YS}$) formed in the transmitter matrix and that each time different fractions ($\beta_1 \cdot h_s \cdot Y_{GSo} \cdot U_{RS}$ and $\beta_2 \cdot h_s \cdot Y_{BS}$) which are proportional to this adjustable portion are added to said luminance signal ($U_{YS}$) and/or that adjustable and proportionally different fractions ($k_{10} \cdot a_1 \cdot h \cdot U_{(R-Y)S}$ and $k_{20} \cdot a_2 \cdot h \cdot U_{(B-Y)S}$ of the two transmitted color difference signals are added to the third color difference signal ($U_{(G-Y)S}$) recovered in the receiver matrix by combination of the transmitted color difference signals ($U_{(R-Y)S}$ and $U_{(B-Y)S}$).

Figure 2:
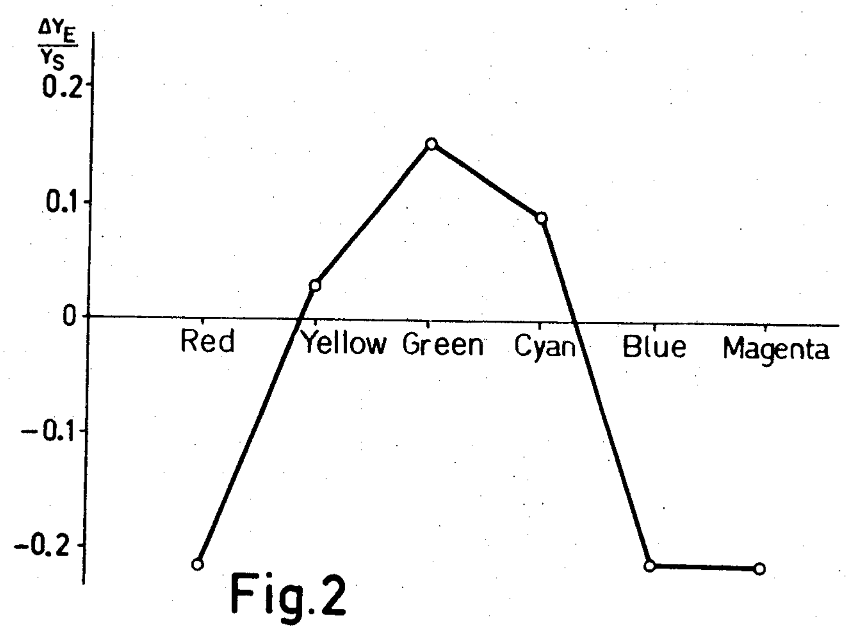
Figure 3:
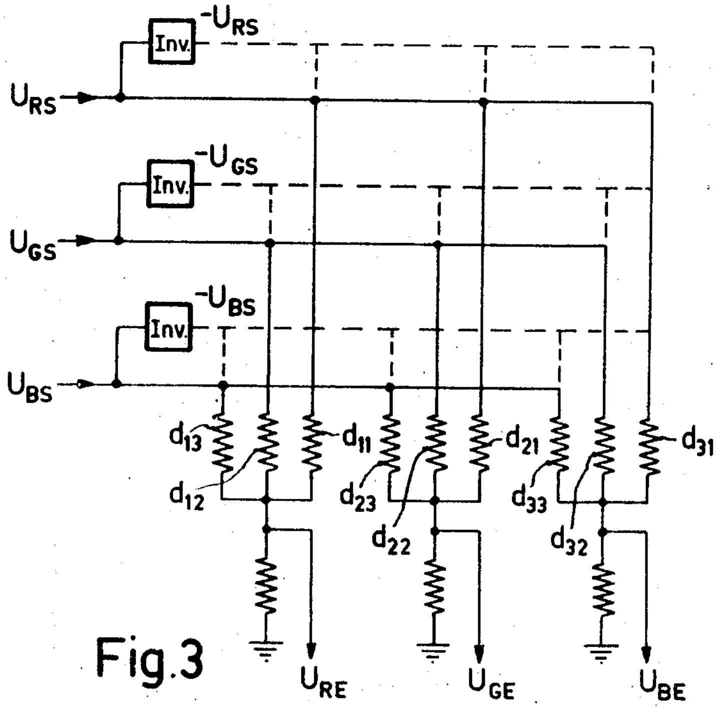
Figure 4:
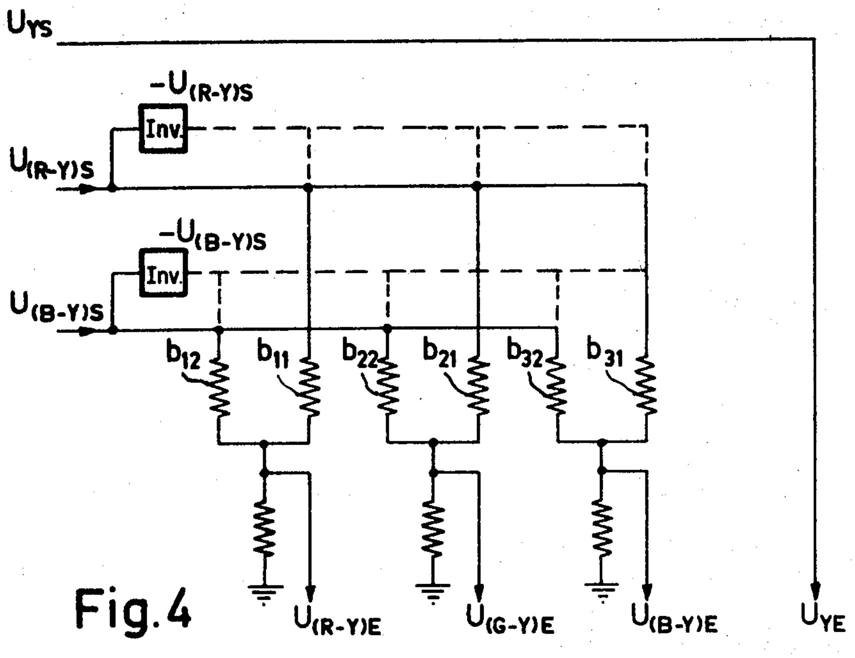
Figure 5A:
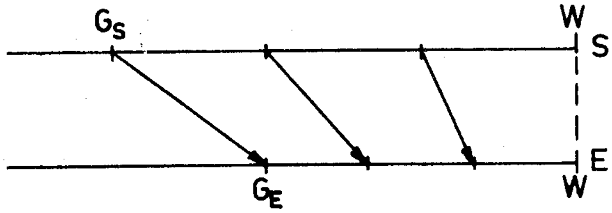
Figure 5B:
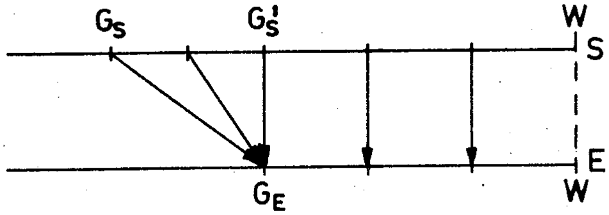
Figure 6:
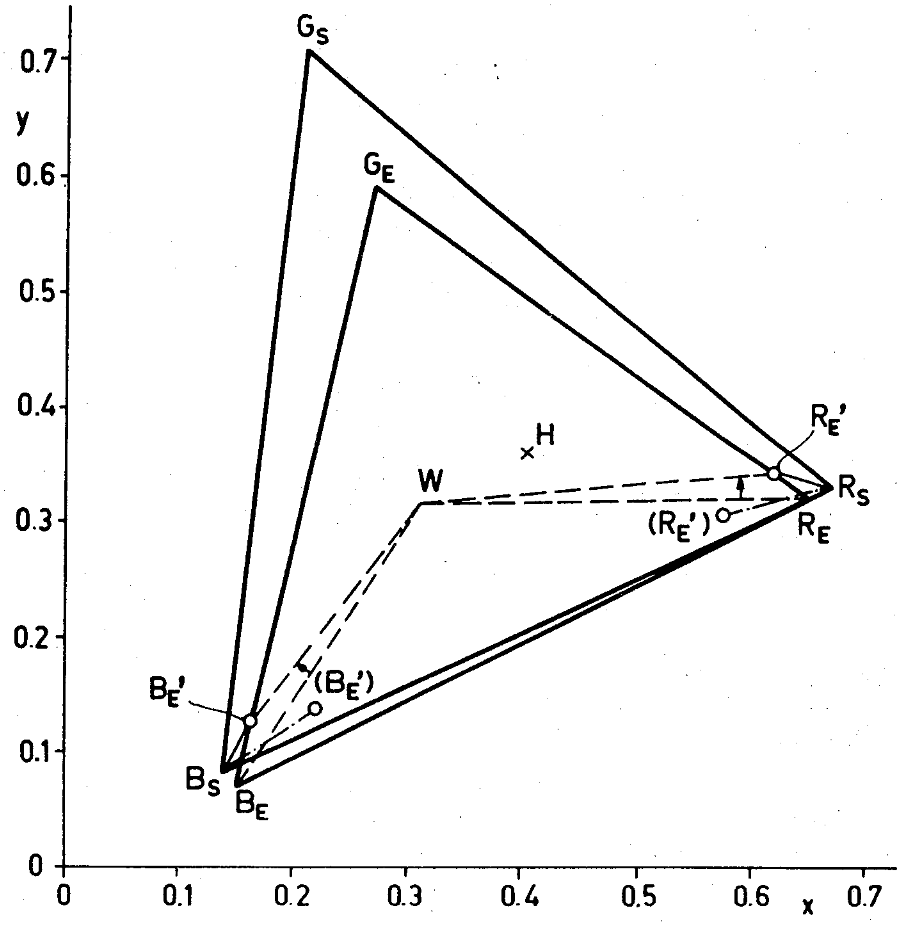
Figure 10:
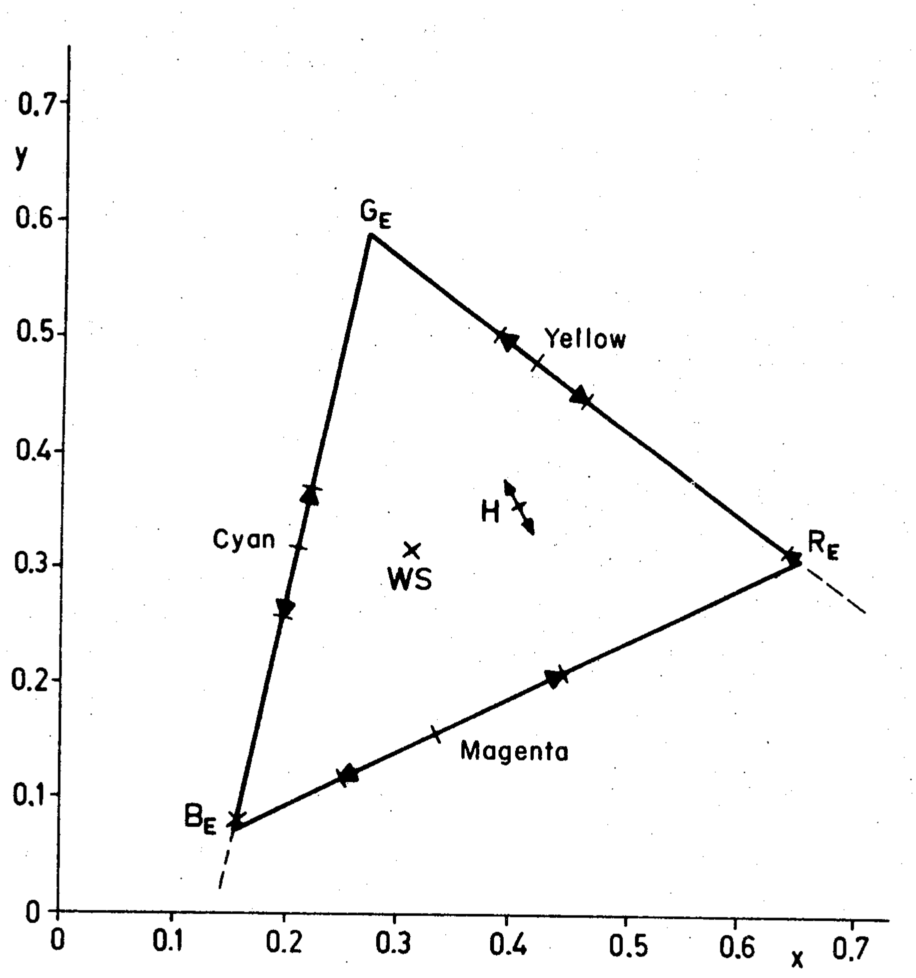
Figure 11:
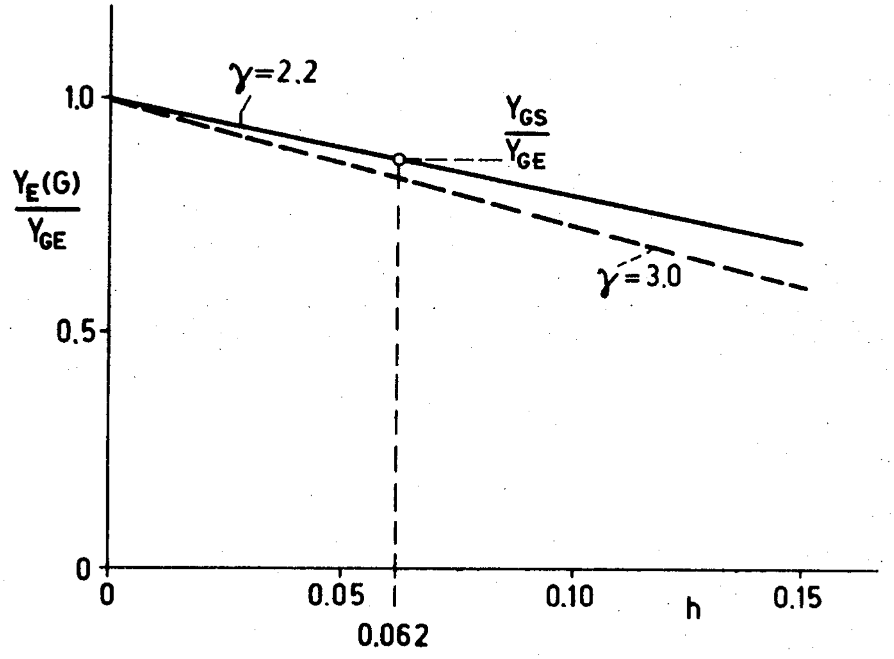
Figure 12:
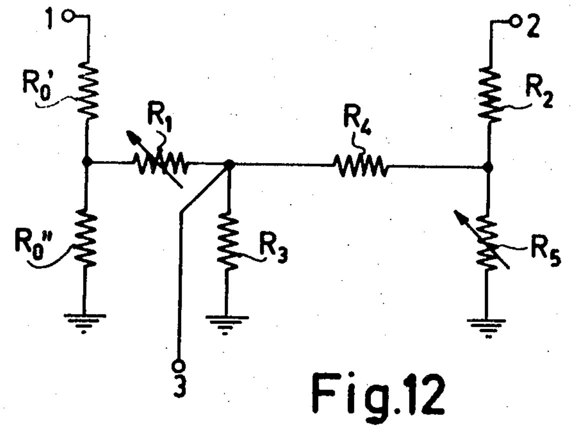
Figure 13:
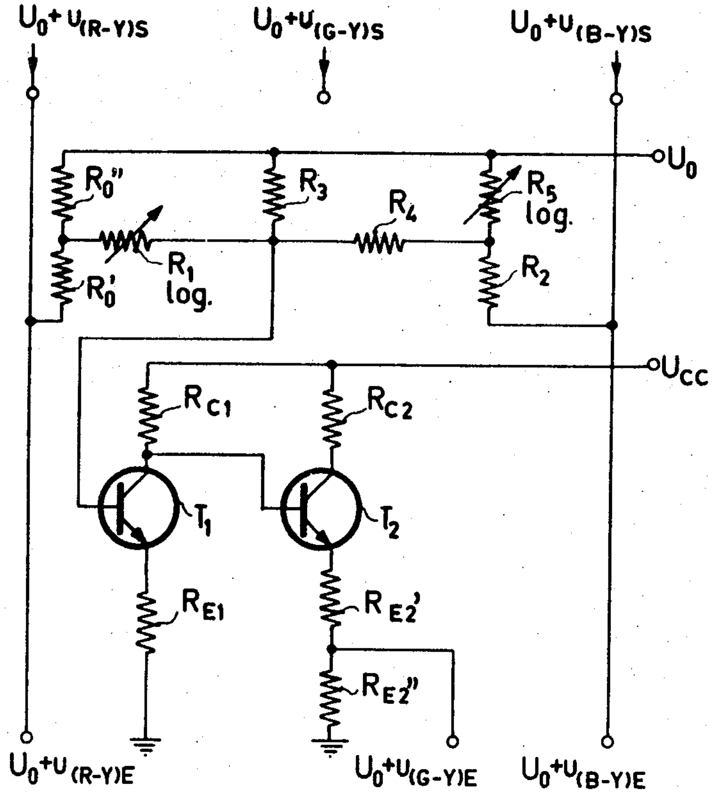
Figure 14:
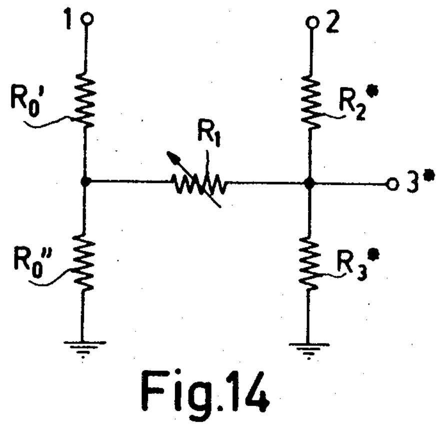
Figure 15:
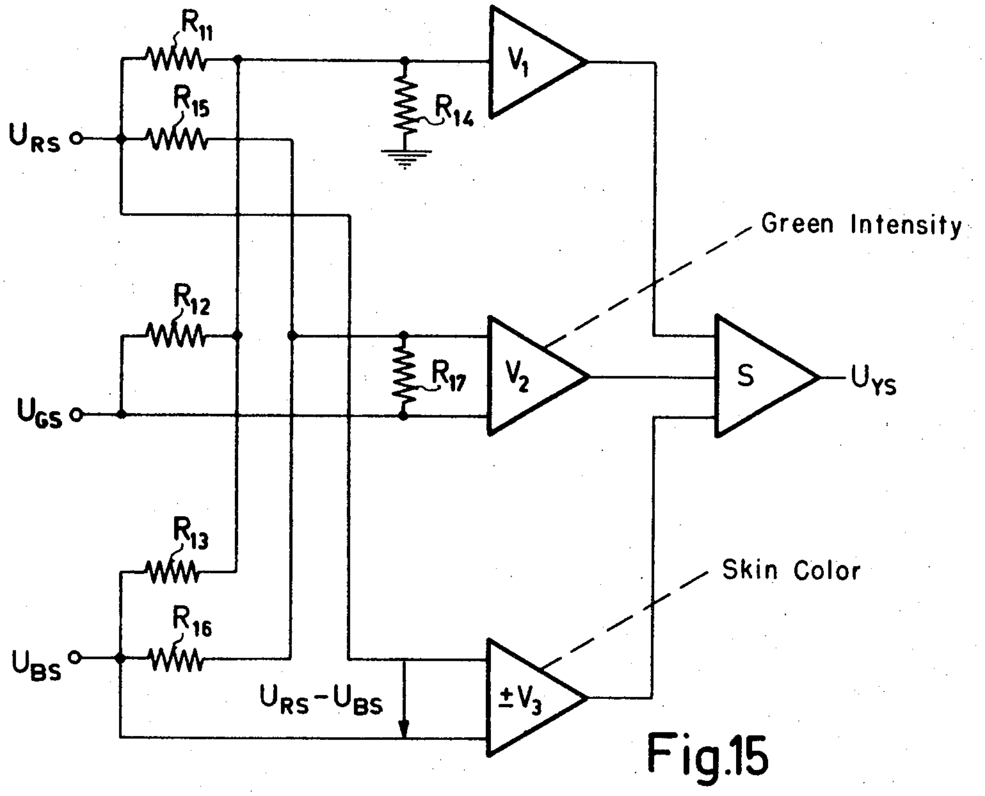

The invention will be further described in the following with reference to the accompanying drawings in which:

FIG. 1 shows the color points according to the DIN-normalization,

FIG. 2 is a curve showing intensity deviations of a display as functions of the displayed color, FIG. 3 is a circuit diagram of a possible general purpose correction matrix for a transmitter, FIG. 4 is a circuit diagram of a possible general purpose correction matrix for a receiver, FIGS. 5*a* and 5*b* illustrates the aspect of a signal correction, FIG. 6 illustrates the desired shift of some color points, FIGS. 7, 8, 9, 10 and 11 are explanative figures for explaining theoretical problems which are the for the invention, FIG. 12 is a circuit diagram of a receiver correction matrix according to the invention, FIG. 13 is a more illustrated circuit diagram, of a receiver correction matrix according to the invention, FIG. 14 is a circuit diagram of a simplified receiver correction matrix according to the invention, FIG. 15 is a block diagram of a transmitter correction matrix according to the invention.

POSING THE PROBLEM

In color television multiplicity of error possibilities exist due to imperfections throughout the transmission path in the transmitter and the receiver and due to differences between the fixed color valences of the system and those of the luminescent materials for the picture display tubes. Furthermore there are error possibilities which principally emanate from the NTSC-(also PAL and SECAM systems.

The errors caused at the receiver end by the differences between the fixed NTSC color valences and the color valences of the luminescent materials used for the picture display tubes are described hereinafter. All other conditions are assumed to be ideal.

FIG. 1 shows the color points in the DIN-standard color diagram. The reference S (transmitter) denotes the fixed NTSC color points, the reference E (receiver) denotes those of the luminescent materials of the picture display tube VALVO A 63 -11 X.

The coordinates of the NTSC valences for red, green, blue and the white points are $$x_{RS} = 0.067, \quad y_{RS} = 0.33,$$
$$x_{GS} = 0.21, \quad y_{GS} = 0.71, \quad (1)$$
$$x_{BS} = 0.14, \quad y_{BS} = 0.08,$$
$$x_{WS} = 0.310, \quad y_{WS} = 0.316 \quad (2)$$

The coordinates for the valences of the luminescent materials are:

$x_{RE}=0.650$, $y_{RE}=0.320$,
$x_{GE}=0.270$, $y_{GE}=0.590$,
$x_{BE}=0.152$. $y_{BE}=0.070$. (3)

In the following considerations it has been assumed that the white point of the picture display tube is likewise adjusted at "NTSC-white" (Standard C) in accordance with the Equations (2).

When the colors $R_S$, $G_S$, and $B_S$ of FIG. 1 are transmitted, the colors $R_E$, $G_E$, $B_E$ are displayed by the picture tube. This causes errors with respect to both hue and color saturation and luminance.

The hue errors (angle deviations of the radii extending from the white point towards a color point and color saturation errors (distances from the white point) are clearly shown in FIG. 1. In this respect it is, however, to be noted that the distinctions in hue as seen by the observer and the stages of color saturation are distributed over the color triangle in a comparatively complicated manner.

An error which has until now been comparatively little observed is the luminance or intensity error which does not appear in the plane representation of the color triangle. It is found that the intensity error may have a much greater influence on the subjectively assessed picture quality than the saturation error.

FIG. 2 shows the relative intensity errors caused by the distinctions between the color points in accordance with Equations (1) to (3).

Red, blue and magenta are reproduced with an intensity which is somewhat too weak, whereas green and cyan are reproduced with an intensity which is somewhat too strong. Experience shows that the decrease in intensity remains substantially unnoticed in the case of red, blue and magenta. On the other hand too much intensity in the case of green is clearly noticed. In that case the comparatively dark green of woods is experienced as "grass green."

The ability to notice changes in color as regards all three qualities is a very difficult problem especially in motion pictures. This ability depends on many secondary conditions, for example, the acuity of the human eye, the detailed structure of the observed surfaces and their enviromental accommodation and also on the kind of comparisons tuning made. The frequently used tolerance ellipses (JNCD-ellipses, just noticeable color differences) and the more extensive data with regard to the luminances, the "tolerance ellipsoide" in the three-dimensional color space are only usable to a limited extent for color television. Furthermore it is known nowadays that the surrounding luminance exerts quite a considerable influence on the subjective judgement of the color picture quality.

The color of the human skin is of special importance in the color reproduction of every day life motion pictures, It is extremely critically judged, particularly as regards its hue. The color of the skin corresponds approximately to the coordinates $$x_H=0.405, \quad y_H=0.360 \quad (4)$$

It is reproduced by the color picture tube A 63-11 X at $$x_{HE}=0.386, \quad y_{HE}=0.356 \quad (5)$$

Figure 9:
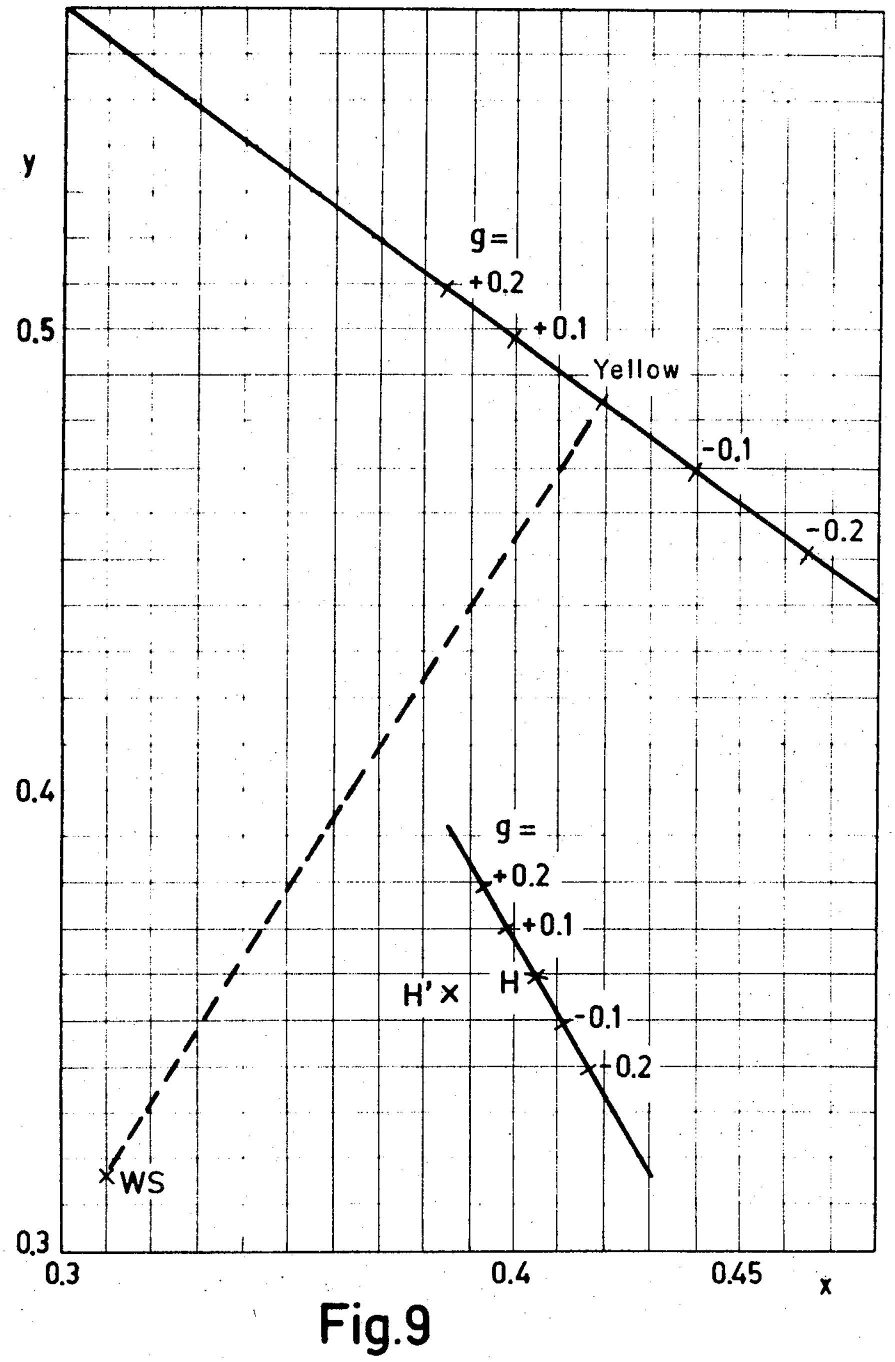

(compare H' in FIG. 9). The saturation is somewhat less, the hue is somewhat more yellowish. Since corrections are already generally performed at the transmitter end, a fixed correction at the receiver end makes little sense; it should be manually adjustable.

Similar considerations apply to the reproduction of the green color. Experience gained from the observation of every day life motion pictures on the picture screen shows that particularly a correction of the intensity of the green hue is desirable.

A combined adjustment of the intensity of the skin color and of green intensity is dealt with hereinafter.

CHANGES IN COLORS BY MEANS OF TENSOR TRANSFORMATION OF THE SIGNAL VOLTAGES

Corrections by means of additionally adjusted phase shifts of the chromaticity signal in the PAL-system are largely impracticable for steps to be taken at the receiver end because the PAL-system does compensate phase shifts. A phase shift would therefore be possible at the video end only after switching the (R–Y) components, and circuit arrangements for the phase shifts then become comparatively complicated.

A less expensive possibility of color corrections exists in the use of a linear tensor transformation of the signal voltages. This generally requires only a network including common resistors and optionally an inverter stages so as to have one of the signals available at negative polarity.

The colorimetric relationships and the special problem of tensor transformation of the signals which carry the color information and intensity valences on the transmission path within the color television receiver are known. The important question of changes in luminance is not considered yet.

It is assumed to start from a network whose inputs receive transmitter voltages $U_{RS}$, $U_{GS}$, $U_{BS}$ which should be standardized in such a manner that the three primary colors are transmitted every time at a value of 1; thus for NTSC white there should apply that $U_{RS} = U_{GS} = U_{BS} = 1$.

Corresponding voltages $U_{RE}$, $U_{GE}$, $U_{BE}$ should be required for controlling the picture tube subsequent to the network, so that the color points $R_E$, $G_E$, $B_E$ and for $U_{RE}=U_{GE}=U_{BE}=1$ the NTSC white appear.

A general linear tensor relation between the "receiver voltages" and "transmitter voltages" then is $$U_{kE}=\Sigma d_{kl}U_{lS}$$

$$(k \triangleq R_E, G_e, B_E;\ 1 \triangleq R_S, G_S, B_S) \quad (6)$$

Inverter stages should be optionally present in the network so that also negative coefficients ($d_{kl} < 0$) may occur. FIG. 3 shows the principle circuit diagram and FIG. 4 shows a corresponding circuit arrangement in which the color difference signals instead of the tristimulus signals are transformed. The latter otherwise only applies if the white point is to remain constant which, however, is to be assumed in this respect.

QUALITATIVE CONSIDERATIONS

It is obvious to choose the tensor transformation in such a manner that color points ($R_S$, $G_S$, $B_S$ in FIG. 1) provided by the transmitter are reproduced as the same color points by the picture tube. This, however, is only possible to a limited extent since only color points within the triangle $R_E$, $G_E$, $B_E$ of FIG. 1 can be produced. However, it is possible for an original color point $G_S'$ to appear within the inner triangle at $G_E$, thus also, for example, when $G_S'$ is located just near $G_E$. To make this more distinct, $G_S$, $G_E$ and W are assumed to be in alignment.

FIG. 5*a* shows the color points along the straight line at the transmitter (thus at the original point), FIG. 5*b* shows the color points for the color picture tube.

FIG. 5*a* shows the case without transformation. All green saturation stages are shown in a reduced manner. In FIG. 5*b* all green values between W and $G_E$ are shown correctly, but all values between $G_S$ and $G_E$ seem to be concentrated at $G_E$. Thus an improvement in the green color would certainly be expected with a view to normally ocurring green values as regards their saturation.

However, the method has a series of drawbacks:

First it can immediately be seen that greatly saturated green values (between $G_S$ and $G_E$) are reproduced without gradation. In more general terms this means that each color point located between the NTSC triangle and the triangle for the luminescent material is projected on the edge of the triangle for the luminescent material (compare FIG. 1). In that case partially negative voltages $U_{RE'}$ $U_{GE}$, $U_{BE}$ occur which cut off one or two systems. This leads to additional deviations in hue.

A further drawback resides in the non-linearity of the picture tube characteristic. The $\gamma$-exponent allows a true reproduction of the color points only at three points, for example, at $G_E$, $R_E$, $B_E$ including the white point W. The $\gamma$-exponent causes deviations in hue at all other color points.

However, the main drawback resides in the luminance errors. While, as is known from experience, these errors are within controllable limits, this is no longer the case in a tensor transformation particularly because the $\gamma$-exponent plays an important role in this case. A calculation shows that especially red is reproduced at an intensity which is much higher (relative to the intensity at white) than that which corresponds to NTSC-red. The effect may be slightly alleviated by reducing the amplitude of the chrominance signal (that is to say, the manually adjustable "saturation"). Overdriving of the red gun system of the picture tube is prevented thereby. In that case the too high intensity of the red light is hardly noticed. On the other hand the improvement in the green light is hardly noticed but at the same time the saturation of the other colors is reduced.

It is possible to reduce the increase in intensity of the red and the blue light without decreasing the amplitude of the chrominence signal if a color point $G_S$, $\triangleq G_E$ is not reproduced at $G_E$, but a different color point $G_S$, chosen in a given manner and located in the vicinity of $G_S$ as is 0.8 in FIG. 1. If in addition $G_{S)}4.4.$ is located on the side $G_S$, $B_S$ of the triangle, the intensity of the red light is even entirely maintained which, however, involves a shift in hue from green to yellow simultaneously with an increase in the intensity 713⅓the blue light. Conversely, the choice of $G_S$, on the side $G_S$, $R_S$ of the triangle results in a shift in the hues from green to cyan while the intensity of the red light is simultaneously increased. The intensity of the blue light then remains constant.

However, all these possibilities have been found to be little useful. In fact, experiments showed that the human eye notices the green saturation variations to a much lesser extent than variations in the green light intensity. It might be expected that a greater intensity could mislead the eye into seeing a greater color saturation. In that case it might be attempted to increase the intensity of the green light without shifting the color points. The opposite is actually true. In case of equal saturation the less intensive green ("wood green") is experienced as being more saturated than a non intensive green ("grass green"). The impression of too weak a saturation in the green light is actually given by the too great intensity (compare FIG. 2). Thus it is less important to increase the color saturation in the green light but rather to reduce the too great intensity according to FIG. 2. Unfortunately this is not simply possible by applying a reduced signal to the green grid of the picture display tube. In this case the white point will be shifted, To reduce the intensity of the green light the color points reproduced corresponding to the red and the blue transmitter colors would rather have to be shifted, namely the receiver red of FIG. 1 on the $R_E$, $G_E$ triangle side would have to be shifted towards $G_E$ and the receiver blue on the $B_E$, $G_E$ triangle side would have to be shifted towards $G_E$. Each separate step already leads to a reduction in the intensity of the green light. FIG. 6 shows the required color point shifts. Without tensor transformation $R_S$ appears at $R_E$, with transformation $R_S$ appears at $R_E$, and correspondingly on the blue side. As usual $G_S$ is shown near $G_E$.

Shifts from $R_E$ to $R_E'$, $B_E$ to $B_E'$ simultaneously involve given variations in all colors except for green and for the white point. Both shifts then also change the color of the skin to which the eye reacts sensitivity.

However, it is feasible that the two color points $R_E$, $B_E$ are shifted simultaneously and in a given proportion along the side of the triangle [$R_E \rightarrow G_E$, $B_E \rightarrow G_E$] in such a manner that the color of the skin is maintained. It must then be checked whether the color point variations for red and blue occurring for a desired degree of the green light intensity and the associated variations in intensity remain sufficiently small.

A principally possible shift of the color points more into the heart of the triangle ($R_E'$) and $B_E'$) (broken line arrows in FIG. 6) is to be avoided as much as possible, since the attainable color saturation of the picture tube (possibly unnecessarily) would be limited in the cyan and yellow ranges. As will further be described a usable correction of the green light is indeed possible with the aid of shifts $R_E \rightarrow R_E'$, $B_E \rightarrow B_E'$ on the side of the triangle. Since the color of the skin is influenced with the aid of given $R_E$, $B_E$-shifts, it is also possible to carry out a separate adjustment of the color of the skin; the following should be considered with respect to the structure and proportioning of the network.

MATRIX FOR COLOR POINT SHIFTS

The general linear tensor transformation of the signal voltages according to the Equation (6) is written in the form of $$\begin{pmatrix} U_{RE} \\ U_{GE} \\ U_{BE} \end{pmatrix} = \begin{pmatrix} d_{11} d_{12} d_{13} \\ d_{21} d_{22} d_{23} \\ d_{31} d_{32} d_{33} \end{pmatrix} \begin{pmatrix} U_{RS} \\ U_{GS} \\ U_{BS} \end{pmatrix} \qquad (7)$$

Since in case of white all voltages $U_{kE} = 1$, $U_{kS} = 1$ there must apply that $$d_{11}+d_{12}+d_{13}=1,$$
$$d_{21}+d_{22}+d_{23}=1, \qquad (8)$$
$$d_{31}+d_{32}+d_{33}=1.$$

Under this condition also the matrix for the color difference signals becomes comparatively simple. The nonvaried luminance signal $$U_{YE}=U_{YS} \qquad (9)$$

then serves only for recovering the drive signals for the display device from the color difference signals. Otherwise Equation (9) does not imply the same intensities of the original and the reproduced color (except for white) and neither if the picture tube luminescent valences were the same as the NTSC-valences and if linear characteristics ($\gamma=1$) would be assumed.

Since the three color difference signals are clearly derived from the three signals provided by the transmitter, $U_{YE}$ only serves as an auxiliary magnitude in order to gain the tristimulus signals in the picture tube.

If a new "actual" luminance signal of the reproduction is defined as $$\overset{\frown}{U}_{YE}=\overset{\frown}{Y}_{RE}\,U_{RE}+\overset{\frown}{Y}_{GE}\,U_{GE}+\overset{\frown}{Y}_{BE}\,U_{BE}\,, \qquad (9a)$$

then in this case there applies no longer that $$\overset{\frown}{U}_{YE}=U_{YE}=U_{ys}.$$

For this reason changes in the intensity of the colors (except for given chosen colors) occur generally at each transformation of the signal voltages.

The general matrix for color difference signals acquires the form $$\begin{pmatrix}U_{(R-Y)E}\\U_{(G-Y)E}\\U_{(B-Y)E}\end{pmatrix}=\begin{pmatrix}b_{11}\,b_{12}\\-k_1-k_2\\b_{21}\,b_{22}\end{pmatrix}\begin{pmatrix}U_{(R-Y)S}\\U_{(B-Y)S}\end{pmatrix} \qquad (10)$$

With $U_{(R-Y)} = U_R - U_Y$ etc. the following transformations are obtained therefor $$b_{11}=d_{11}-k_{10}\,d_{12},$$
$$b_{12}=d_{13}-k_{20}\,d_{12}$$
$$k_1=k_{10}\,d_{22}-d_{21},$$
$$k_2=k_{20}\,d_{22}-d_{23}, \qquad (11)$$
$$b_{21}=d_{31}-k_{10}\,d_{32},$$
$$b_{22}=d_{33}-k_{20}\,d_{32},$$

with $$k_{10}=Y_{RS}/Y_{GS}=0.5098,$$
$$k_{20}=Y_{BS}/Y_{GS}=0.1954. \qquad (12)$$

The Values (12) are the coefficients of the so-called "NTSC-color difference green matrix" which is further given below with reference to (15).

In the Equations (11) there applies the Equation (8) (the same white point in the transmitter and receiver); thus three coefficients can be eliminated.

Conversely, the coefficients $d_{kl}$ of the signal voltage Matrix (7) are obtained from the coefficients of the color difference signal Matrix (10) in accordance with:

$$d_{11}=\frac{1}{N}\,(k_{10}+(1+k_{20})b_{11}-k_{10}b_{12}),$$
$$d_{12}=\frac{1}{N}\,(1-b_{11}-b_{12}),$$
$$d_{13}=\frac{1}{N}\,(k_{20}-k_{20}b_{11}+(1+k_{10})b_{12}),$$
$$d_{21}=\frac{1}{N}\,(k_{10}-(1+k_{20})k_1+k_{10}k_2),$$
$$d_{22}=\frac{1}{N}\,(1+k_1+k_2), \qquad (13)$$
$$d_{23}=\frac{1}{N}\,(k_{20}+k_{20}k_1-(1+k_{10})k_2),$$
$$d_{31}=\frac{1}{N}\,(k_{10}+(1+k_{20})b_{21}-k_{10}b_{22}),$$
$$d_{32}=\frac{1}{N}\,(1-b_{21}-b_{22}),$$
$$d_{33}=\frac{1}{N}\,(k_{20}-k_{20}b_{21}+(1+k_{10})b_{22}),$$
$$N=1+k_{10}+k_{20}.$$

In this case the Conditions (8) of the constant white point are already fulfilled.

MATRIX FOR SHIFTS $R_E \rightarrow R_{E'}$, $B_B \rightarrow B_{E'}$

If the green color point $G_S$ is to be reproduced near $G_E$ then the coefficients $d_{12}$ and $d_{32}$ in the Matrix (7) disappear, while only a signal $U_{GE}$ is to be available when signal $U_{GS}$ is exclusively available.

If the red color point $R_S$ is to be reproduced on the side $R_E$, $G_E$ of the triangle, it is necessary for the signal $U_{RS}$ which is available only that $U_{BS}=0$, that is to say, the coefficient $d_{31}$ disappears. The same is effected on the side $B_E$, $G_E$ of the triangle at which $d_{13}$ disappears. In that case only two free parameters remain; they are referred to as $h_1$ and $h_2$ and are provisionally introduced in the following form:

$$\begin{pmatrix}U_{RE}\\U_{GE}\\U_{BE}\end{pmatrix}=\begin{pmatrix}1 & 0 & 0\\ \frac{h_1}{2}+h_2 & 1-h_1 & \frac{h_1}{2}-h_2\\ 0 & 0 & 1\end{pmatrix}\begin{pmatrix}U_{RS}\\U_{GS}\\U_{BS}\end{pmatrix} \qquad (14)$$

and $$\begin{pmatrix}U_{(R-Y)E}\\U_{(G-Y)E}\\U_{(B-Y)E}\end{pmatrix}=\begin{pmatrix}1 & 0\\-k_1 & -k_2\\0 & 1\end{pmatrix}\begin{pmatrix}U_{(R-Y)S}\\U_{(B-Y)S}\end{pmatrix} \qquad (15)$$

with $$k_1=k_{10}-(k_{10}+1/2)\,h_1-h_2,$$
$$k_2=k_{20}-(k_{20}+1/2)\,h_1+h_2. \qquad (16)$$

The Matrix (15) shows that only the so-called "green matrix" is changed. The new Coefficient (16) come in the place of the known coefficients $k_{10}$, $k_{20}$ in accordance with the Equations (12).

VARIATION IN THE INTENSITY OF THE GREEN LIGHT AT A CONSTANT SKIN COLOR

A function $h_2 = f(h_1)$ is to be found in which the color point for the skin color remains unchanged; subsequently the variations in the intensity of the green light as well as the color variations in the red and the blue light are calculated.

An original skin color is reproduced without transformation in case of a color point $$x_H = 0.405, \qquad y_H = 0.360.$$

The magnitudes $h_1$ and $h_2$ in the Equations (16) are to be chosen in such a manner that $x_H$ and $y_H$ do not change. To this end the voltage rations $\sigma_G$ and $\sigma_B$ required for $x_E = x_H$, $y_E = y_H$(skin color reproduction) are first found from the equations for color mixing $$\sigma_G=\frac{U_{GE}}{U_{RE}}=\left\{\frac{m_{RE}}{m_{GE}}\left[\frac{(y_H-y_{BE})(x_H-x_{RE})-(x_H-x_{BE})(y_H-y_{RE})}{(y_H-y_{GE})(x_H-x_{BE})-(x_H-x_{GE})(y_H-y_{BE})}\right]\right\}^{1/\sigma}$$

$$\sigma_B=\frac{U_{BE}}{U_{RE}}=\left\{\frac{m_{RE}}{m_{BE}}\left[\frac{(y_H-y_{GE})(x_H-x_{RE})-(x_H-x_{GE})(y_H-y_{RE})}{(y_H-Y_{BE})(x_H-x_{GE})-(x_H-x_{BE})(y_H-y_{GE})}\right]\right\}^{1/\sigma}$$

(These expressions may alternatively be used for other color points which are to be maintained constant when $y_H$, $x_H$ are replaced by the values of the color points chosen).

In the relevant case employing the Values (3) and $\gamma = 2.2$ there is obtained $$\sigma_G = 0.53375; \qquad \sigma_G = 0.75174,$$
$$\sigma_B = 0.29801; \qquad \sigma_B = 0.57678. \quad (18)$$

If $\sigma_G$ and $\sigma_B$ are not to be varied, there must apply according to Matrix (14) that $$\sigma_G=\left(\frac{h_1}{2}+h_2\right)+(1-h_1)\sigma_G+\left(\frac{h_1}{2}-h_2\right)\sigma_B$$

or $$h_2=h_1\frac{\sigma_G-1-\sigma_B}{2(1-\sigma_B)}$$

This is the function $h_2 = f(h_1)$ to be found. According to Equations (16) with $h_1 = h$ it then applies that $$k_1=k_{10}\left[1-\left(1+\frac{\sigma_G-\sigma_B}{k_{10}(1-\sigma_B)}\,h\right)\right]=k_{10}[1-q_1h]$$
$$k_2=k_{20}\left[1-\left(1+\frac{1-\sigma_B}{k_{20}(1-\sigma_B)}\right)h\right]=k_{20}[1-a_2h] \quad (19)$$

For the values of the figures already found there applies subsequently that $$a_1 = 1.8109$$
$$a_2 = 4.0020 \text{ and also} \quad (19a)$$
$$k_1 = k_{10}(1 - 1.8109\,h)$$
$$k_2 = k_{20}(1 - 4.0020\,h).$$

The calculation of the color variations requires the coefficients:

$$d_{21}=\frac{h_1}{2}+h_2$$
$$d_{22}=1-h_1$$
$$d_{23}=\frac{h_1}{2}-h_2$$

in the Matrix (14).

Then we obtain:

$$d_{21}=\frac{\sigma_G-\sigma_B}{1-\sigma_B}\,h$$
$$d_{22}=1-h \quad (21)$$
$$d_{23}=\frac{1-\sigma_G}{1-\sigma_B}\,h$$

or with the Values (18):

$$d_{21} = 0.4134\,h,$$
$$d_{22} = 1 - h, \quad (22)$$
$$d_{23} = 0.5866\,h.$$

The color point variations $R_E \rightarrow R_E'$, $B_E \rightarrow B_E'$ can be calculated from the color mixing equation. It is sufficient to indicate the variation of the coordinates since the color points are shifted along the given sides of the triangle. Thus we obtain:

$$\eta_{RE}=y_{RE'}-y_{RE}=(y_{GE}-y_{RE})\frac{\frac{m_{GE}}{m_{RE}}d_{21}{}^{\gamma}}{1+\frac{m_{GE}}{m_{RE}}d_{21}{}^{\gamma}} \quad (23)$$

and $$\eta_{BE}=y_{BE'}-y_{BE}=(y_{GE}-y_{BE})\frac{\frac{m_{GE}}{m_{BE}}d_{23}{}^{\gamma}}{1+\frac{m_{GE}}{m_{BE}}d_{23}{}^{\gamma}} \quad (24)$$

The associated intensities are $$Y_E(R') = Y_{RE} + Y_{GE}\,d_{21}\,\gamma, \quad (25)$$
$$Y_E(B') = Y_{BE} + Y_{GE}\,d_{23}\,\gamma. \quad (26)$$

In the Equations (23) to (26) $d_{21}$ and $d_{23}$ are functions of $h$ according to Equations (21) and (22), respectively.

The intensity for green light is simply $$Y_E(G) = Y_{GE}\,d_{22}\,\gamma = Y_{GE}(1-h)\,\gamma. \quad (27)$$

If the intensity for green light calculated on the value which is obtained without transformation is written as an independent variable $$(Y_E(G))/(Y_{GE}) = (1-h)\gamma,$$

then the variations can be calculated by introducing the values of the figures in the Equations (23) to (26).

Figure 7:
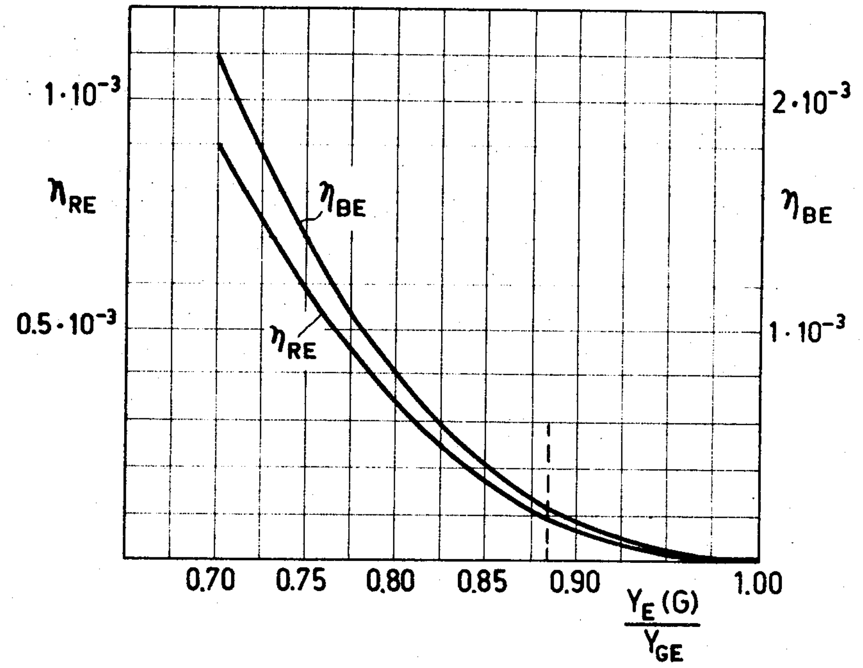

FIG. 7 shows the variations $\eta_{RE}$ and $\eta_{BE}$ as a function of the standardized intensity of the green light. The NTSC intensity of the green light (thus that of the original) $Y_{GS} = 0.5864$ is achieved at $Y_E(G)/Y_{GE} = 0.8682$ (broken line in FIG. 7). In that case the color point shifts are extremely small.

Figure 8:
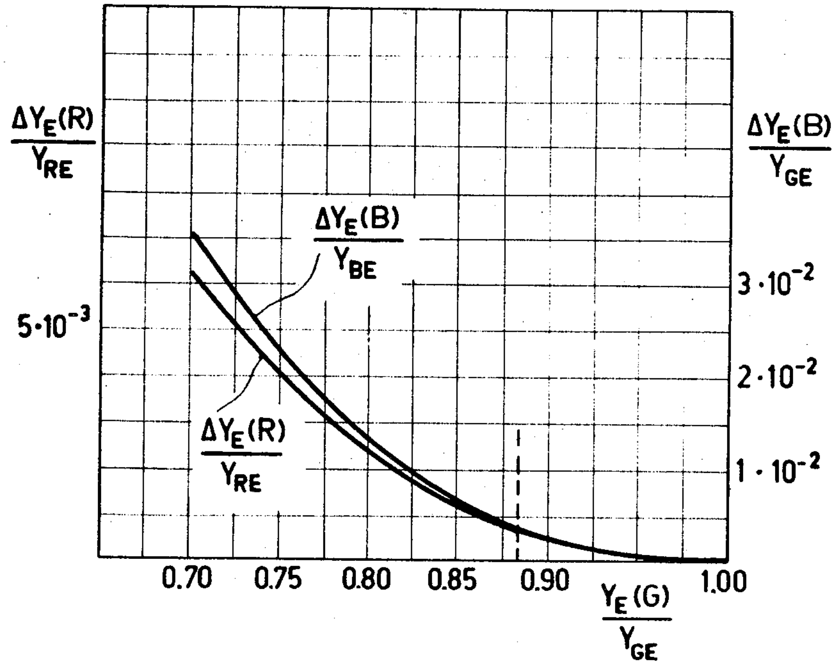

FIG. 8 shows the corresponding variations in intensity for red and blue. Also these variations are extremely small.

Thus conversely it is possible to effect a considerable variation in the intensity of green with comparatively small red and blue color variations at a constant skin color.

VARIATION IN THE SKIN COLOR AT A CONSTANT INTENSITY OF THE GREEN

The possibility of a variation in the skin color at a constant intensity of the green is obtained with the aid of the Matrices (14) and (15), (16). A constant intensity of the green in the Matrix (14) means that $h_1 = 0$ and that in the Equations (16)

$$k_1 = k_{10} - h_2,\ k_{20} = k_{20} + h_2$$

In this case $h_2$ has a different purpose; $h_2$ is replaced by the character $g$.

$$k_1 = k_{10} - g,\ k_2 = k_{20} + g. \quad (28)$$

The coefficients in the Matrix (14) become $$d_{21} = +g,$$
$$d_{22} = 1, \quad (29)$$
$$d_{23} = -g.$$

Qualitatively, the occurrence of $g \neq 0$ results in shifts of opposite sense on the two triangle sides $R_E$, $G_E$ and $B_E$, $G_E$ of FIG. 6. Thus for $g >> 0$ the point $R_E$ is shifted, for example, in the direction of $R_E'$. On the other hand a point $B_S'$ from the transmitter appears on the blue color side between $B_S$ and $G_S$ near $B_E$. If $B_S$ is transmitted the blue gun is "overdriven" to a certain extent. The G signal $U_{GE}$ becomes negative so that the green gun of the picture tube is cut off. Thus the color $B_E$ is reproduced. However, there are of course color point shifts from any point $B_E'$ in the direction of $B_E$. In case of $g > 0$ the analogous ratios are the result on the opposite sides.

The variation in the color point coordinates for the skin color can be calculated with the aid of the color mixing Equations (A1) and (A2) in the appendix A.1 as well as by means of the Values (18). Furthermore the variations in the color points for the colors of the skin and the intermediate colors as well as the variations in intensity can be indicated as a function of $g$.

FIG. 9 shows a section of the color triangle. A considerable hue variation of the skin color H can be obtained with a range of $-0.2 < g < +0.2$, the saturation being changed to a slight extent. Due to the step described yellow is also varied as is shown in the upper part of FIG. 9.

(The point H' is the skin color point reproduced in the receiver according to Equation (5) if originally the point H applies at the transmitter end.)

FIG. 10 shows the variations in the color points for $g = -0.2$ and $g = +0.2$. In case of $g > 0$ the clockwise arrows apply. The broken lines at $R_E$ and $B_E$ only indicate that tendencies in the neighborhood of the points $B_E$, $R_E$ in the sense described above.

Thus it is shown that except for white also the colors red and blue and, as assumed, green remain substantially unchanged. On the other hand variations in the intermediate colors are produced.

relative variations in intensity $\Delta Y_E/Y_{EO}$ are

| $\Delta Y_E/Y_{EO}$ | $g = -0.2$ | $g = +0.2$ | |
|---|---|---|---|
| Red | 0 | +0.050 | |
| Green | 0 | 0 | |
| Blue | +0.131 | 0 | |
| Cadmium | −0.288 | +0.366 | |
| Cyan | +0.435 | −0.342 | |
| Magenta | −0.143 | +0.249 | (30) |

In this case it is of course to be noted that these variations in intensity should not always judged as errors since also different intensities of the optimum colors are associated with different color points. Thus, for example, a yellow color shifted in the direction of red is associated with a weaker intensity of the optimum color.

Since only slight hue variations in the skin color are to be effected with the aid of the skin color correction (comparatively small values $|g|$) the occurring errors in the intermediate colors are indeed not considerable as has also been shown by experiment.

CIRCUIT ARRANGEMENTS FOR SEPARATE CORRECTIONS OF THE SKIN COLOR OF THE INTENSITY OF THE GREEN

The Equations (20) and (28) are used as starting points for the development of the circuit arrangement. For the reduction of green intensity there should apply that $$k_1 = k_{10}(1 - a_1 h),$$
$$k_2 = k_{20}(1 - a_2 h) \quad (31)$$

with $a_1 = 1.8109$, $a_2 = 4.0020$,
$k_{10} = 0.5098$, $k_{20} = 0.1954$ (compare 19*a*, 20)

For the variation in the skin color the coefficients should be $$k_1 = k_{10} - g,$$
$$k_2 = k_{20} + g, \quad (32)$$

Furthermore there applies (compare equation 9) that:

$$U_{(R-Y)E} = U_{(R-Y)S},$$
$$U_{(B-Y)E} = U_{(B-Y)S}\ (U_{YE} = U_{YS}),$$

and $$U_{(G-Y)E} = -k_1 U_{(R-Y)S} - k_2 U_{(B-Y)S}. \quad (33)$$

In the circuit arrangement described in the preamble for the adjustment of the reproduction of a color point in case of a constant white point the desired variation in the color of the skin is obtained while the green intensity remains unchanged if oppositely equally large fraction ($-g \cdot U_{R-Y)S}$ and $+g \cdot U_{(B-Y)S}$) of the two transmitted color difference signals which fractions are adjustable with respect to magnitude and sign are added to or subtracted from the third color difference signal ($U_{(G-Y)S}$) recovered in the receiver matrix by combination of the transmitted color difference signals ($U_{(R-Y)S}$ and $U_{(B-Y)S}$. recovered As will be described hereinafter a corresponding variation is obtained when adjustable and oppositely equally large fractions ($+Y_{GSo} \cdot g_s \cdot U_{RS}$ and $-Y_{GSo} \cdot g_s \cdot U_{BS}$) which are proportional to the color signals ($U_{RS}$ and $U_{BS}$) to be transmitted are added to or subtracted from the luminance signal ($U_{YS}$) formed in the transmitter matrix.

In a corresponding manner a reduction of the green intensity in case of unchanged skin color reproduction is obtained if an adjustable portion ($h_s \cdot Y_{GS} \cdot U_{GS}$) which is proportional to the G-signal is subtracted from the luminance signal ($U_{YS}$) formed in the transmitter matrix and that each time different fractions ($\beta_1 \cdot h_s \cdot Y_{GSo} \cdot U_{RS}$ and $\beta_2 \cdot h_s \cdot Y_{GSo} \cdot U_{BS}$) which are proportional to this adjustable portion are added to said luminance signal and/or that adjustable and proportionally different fractions ($k_{10} \cdot a_1 \cdot h \cdot U_{(R-Y)S}$ and $k_{20} \cdot a_2 \cdot h \cdot U_{(B-Y)S}$ ) of the two transmitted color difference signals are added to the third color difference signal ($U_{(G-Y)S}$) recovered in the receiver matrix by combination of the transmitted color difference signal ($U_{(R-Y)S}$ and $U_{(B-Y)S}$).

FIG. 12 shows a circuit arrangement by means of which the Equations 31 and 32 can be carried into effect substantially independently of each other.

The red color difference signal voltage $U_{(R-Y)}$ is applied to the terminal 1 and the blue color difference signal $U_{(B-Y)}$ is applied to the terminal 2. These voltages which are derived from, for example, the demodulator of a receiver correspond to the signals transmitted by a source, for example, a transmitter and are further handled in a corresponding manner.

A potentiometer comprising a first resistor $R_o'$ and a second earthed resistor $R_o''$ is connected to the terminal 1 and a second potentiometer comprising a third resistor $R_2$ and a grounded resistor $R_5$ is connected to the terminal 2; the taps on these tow potentiometers are connected through a third potentiometer which comprises a fifth resistor $R_1$ connected to the wiper on the first potentiometer and a sixth resistor $R_4$ connected to the wiper on the second potentiometer. The third color difference signal voltage $-U_{(G-Y)}$ is derived at a terminal 3 from the tap on the third potentiometer, an output resistor $R_3$ being connected to ground which resistor may be alternatively formed completely on partly by the input resistor of a following stage.

If the resistances are expressed by their corresponding conductances there applies that:

$$k_1=\frac{G_0'}{G_0'+G_0''}\cdot\frac{G_x}{G_3+G_x+G_y},\ G_i=\frac{1}{R_i} \qquad (34)$$

$$k_2=\frac{G_2}{G_2+G_5}\cdot\frac{G_y}{G_3+G_x+G_y}$$

with $$G_x=\frac{G_1(G_0'+G_0'')}{G_1+G_0'+G_0''},\ G_y=\frac{G_4(G_2+G_5)}{G_4+G_2+G_5}$$

Furthermore there should apply that:

$$R_5=\frac{1}{G_5}=\frac{1}{G_{50}}\ (1-y)\,;\ 0<y<1 \qquad (34a)$$

$$R_1=\frac{1}{G_1}=\frac{1}{G_{10}}\ (1+x)\,;\ -1<x<+9(R_{1\max}=10R_{10})$$

The conditions are $$k_1\,(G_{10}, G_{50})=K_{10}\,,$$

$$k_2\,(G_{10}, G_{50})=k_{20}.$$

Furthermore variations of y should exactly result in the variations $k_1=K_1(h)$, $k_2=k_2(h)$ for $G_1=G_{10}=(1)/(R_{10}$ , and variations of $x$ should exactly result in variations of $k_1 = k_1(g)$, $k_2 = k_2(g)$ accordingly for $G_5 = G_{50} = (1)/(R_{50})$. These are four conditions so that at least five resistors are required when taking into account that only resistance ratios apply. It is found that a further potentiometer is required for which it is possible to choose a resistance freely within limits. If the said conditions are used the resistance ratios calculated on $R_2$ are obtained which according to these formulas are not fixed but may be conditioned by the requirements of the circuit arrangement.

Thus the invention is based on the recognition of the fact that a matrix for recovering the third color difference signal voltage can be formed in such a manner that the coefficients can be varied by approximately the same amounts and in opposite senses by a magnitude which corresponds to the normal value, the green intensity remaining at least substantially constant and the reproduction of the skin color being variable; on the other hand it is possible to vary the green intensity in such a network without influencing the reproduction of the skin color if the portions to be combined of the first and second color difference signals are approximately linearly reduced by means of a magnitude of different coefficients and corresponding to the normal value.

In a circuit arrangement for adjusting at the receiver end, the reproduction of a color point in case of a constant white point by means of electrical color difference signals employing a matrix which is formed by a potentiometer comprising a first ($R_o'$) and a second resistor ($R_o''$) which potentiometer is fed with respect to ground by the first color difference signal (R—Y), a second potentiometer comprising a third ($R_2$) and a fourth ($R_5$) resistor which potentiometer is fed with respect to ground by the second color difference signal (B—Y), and a third potentiometer comprising a fifth ($R_1$) resistor connected to the tap on the first potentiometer and a sixth ($R_4$) resistor connected to the tap on the second potentiometer, the third color difference signal (G—Y) being derived from the wiper on the third potentiometer at an (output) resistor ($R_3$) connected to ground, a simple and satisfactory solution is obtained with little cost if according to a further embodiment of the invention on the normal values of the further potentiometer resistors and of the output resistor are proportioned as follows in case of a given value of the third resistor ($R_2$) at nominal adjustment for the reproduction of the skin color and the green intensity employing associated matrix components for recovering the third color difference signal from the two other color difference signals:

$$R_4=k_{20}(A-1)R_2$$

with $$A=\frac{a_2}{a_1}=\frac{4.0020}{1.8109}=2.21 \qquad (35)$$

with $$R_1=R_{10}=P\cdot R_2-Q\cdot(R_0'+R_0'') \qquad (35a)$$

$$P=\frac{k_{20}(k_{20}A+k_{10})}{k_{10}\left[1+k_{20}(A-1)\frac{R_2}{R_3}\right]} \qquad (35b)$$

and $$Q=(k_{10}+k_{20})[1-(k_{10}+k_{20})] \qquad (35c)$$

$$R_0'+R_0''<\frac{P}{Q}\cdot R_2 \qquad (35d)$$

$$\frac{R_0''}{R_0'+R_0''}=k_{10}+k_{20} \qquad (35e)$$

$$R_3>\frac{(k_{10}+k_{20})[k_{20}(A-1)+1]}{1-(k_{10}+k_{20})}R_2 \qquad (35f)$$

$$R_5=R_{50}=\frac{k_{10}+k_{20}}{1-(k_{10}+k_{20})} \qquad (35g)$$

$$\frac{1+k_{20}(A-1)\cdot\frac{R_2}{R_3}}{1-\frac{k_{10}+k_{20}}{1-(k_{10}+k_{20})}[k_{20}\cdot(A-1)+1]\cdot\frac{R_2}{R_3}}R_2 \qquad (35h)$$

wherein the fifth resistor is variable for the purpose of varying the color of the skin.

The ratio $R_2/R_3$ can be freely chosen below the given limit, that is to say, the output resistance can be fixed above a minimum value.

It is also possible to choose $(R_o' + R_o'')$. The above given formulas may be represented as follows:

$$\frac{R_0'}{R_2}=(1+D)v \qquad (36)$$

$$\frac{R_0''}{R_2}=\left(\frac{1+D}{D}\right)v \qquad (36a)$$

$$\frac{R_{50}}{R_2}=\frac{C+z}{CD-(1+C)z} \qquad (36b)$$

$$\frac{R_{10}}{R_2}=\left(\frac{B}{C+z}\right)-v \qquad (36c)$$

$$\frac{R_4}{R_2}=\frac{1}{C} \qquad (36d)$$

$$\frac{R_3}{R_2}=\frac{1}{z} \qquad (36e)$$

and $A=2.21$ (dependent on the nominal value of the skin colour) (36f)

$$B=\frac{1}{A-1}\left(\frac{k_{20}}{k_{10}}A\right) \qquad (36g)$$

$$C=\frac{1}{k_{20}(A-1)} \qquad (36h)$$

$$D=\frac{1}{k_{10}+k_{20}}-1 \qquad (36i)$$

Again the reference resistance which can principally be chosen is $R_2$ and the magnitudes $v$ and $z$ are to correspond to the following inequations:

$$z<\frac{CD}{1+C},\ v<\frac{B}{C}\left(\frac{1+C}{1+C+D}\right) \qquad (36k)$$

The relation between the above-mentioned magnitudes $h, g$ (Formulas 31 and 32) and $x, y$ (Formulas 34$a$) is $$h\Big|_{x=0}=\frac{1}{a_2}\,\frac{(1-p)y}{(1-py)},\quad g\Big|_{y=0}=k_{10}\,\frac{qx}{1+qx} \qquad (37)$$

with $$p=\frac{(k_{10}+k_{20})k_{20}A+k_{10}}{k_{20}A+k_{10}}+\frac{(k_{10}+k_{20})k_{20}A[k_{20}(A-1)+1]}{k_{20}A+k_{10}}\,\frac{R_2}{R_3} \qquad (37a)$$

$$q=\frac{k_{20}}{k_{10}+k_{20}}(1-\epsilon) \qquad (37b)$$

$$\epsilon=\frac{1}{1+\frac{R_{10}(R_0'+R_0'')}{R_0'\cdot R_0''}} \qquad (37c)$$

$$\frac{R_0'R_0''}{R_0'+R_0''}=(k_{10}+k_{20})[1-(k_{10}+k_{20})](R_0'+R_0'') \qquad (37d)$$

The maximum attainable adjustments for→1 are $$h_{max}=\frac{1}{a_2} \qquad (38)$$

and for $x\rightarrow 1$ $$-g\Big|_{max}=\frac{k_{10}q}{1-q}=k_{20}\frac{(1-\epsilon)}{\left(1+\frac{k_{20}}{k_{10}}\epsilon\right)} \qquad (39)$$

as well as for $x\rightarrow +9$ $(R_{1max}=10\,R_{10})$ $$+g\Big|_{max}=\frac{9k_{10}q}{1+9_q}=\frac{9k_{10}k_{20}}{k_{10}+10k_{20}}\frac{(1-\epsilon)}{\left(1-\frac{9k_{20}}{k_{10}+10k_{20}}\epsilon\right)} \qquad (40)$$

The numerical values are now introduced and then we find that:

$$R_{10}=0.3609\,R_2\,\frac{1}{1+0.2364\frac{R_2}{R_3}(R_0'+R_0'')}-0.2079 \qquad (40a)$$

$$R_4=0.2364\,R_2,$$

$$R_{50}=2.3921\,R_2\frac{1+0.2364\frac{R_2}{R_3}}{1-2.9576\frac{R_2}{R_3}},$$

$$\frac{R_0''}{R_0'+R_0''}=0.7052,$$

$$\frac{R_2}{R_3}<0.3381. \qquad (41)$$

The attainable adjustments are $$h_{max}=0.2499$$

$$-g\Big|_{max}=0.1954\left(\frac{1-\epsilon}{1+0.3833\epsilon}\right),$$

$$+g\Big|_{max}=0.3639\left(\frac{1-\epsilon}{1-0.7138\epsilon}\right),$$

$$\epsilon=0.5761\left(1+0.2364\frac{R_2}{R_3}\right)\cdot\frac{R_0'+R_0''}{R_2} \qquad (42)$$

The possibilities of variations are amply proportioned. FIG. 11 shows the standardized green intensity as a function of $h$. In case of $h = 0.0062$ the original intensity according to the NTSC-system is obtained. If it is taken into account that $\gamma$ is often more than 2.2, then $h = 0.1$ might be sufficient.

Since the output for $U_{(G-Y)E}$ usually has no arbitrarily great terminating impedance one should not choose $R_3 \rightarrow \infty (R_2/R_3 \rightarrow 0)$. In addition the potential divider $R_o'$, $R_o''$ should have a sufficiently small resistance lest the values $g_{max}$ are unnecessarily restricted.

In the above given proportioning a voltage division of the (R—Y) signal and the (B—Y) signal is obtained between the terminals 1 and 2 and the output 3 in the ratio $k_{1o} = 0.5098$ and $k_{2o} = 0.1954$ and hence the production of the third (green) color difference signal in accordance with the correct standard. However, the circuit arrangement is simultaneously structured and proportioned in such a manner that an adjustment of the reproduction of the color points associated with the applied signals for the skin color is possible by means of a possibly considerable reduction of the value of the fifth resistor $R_1$ or by means of a considerable increase, for example, a tenfold increase without the white point and the reproduction of the green intensity varying; thus the character of the picture is substantially maintained while yet the desired matching may be obtained.

On the other hand a variation in the adjustment of the green intensity is possible without an essential variation in the white point or the possibly corrected skin color if the value of the fourth resistor $R_5$ is reduced down from the normal value.

A logarithmic relationship between adjusting magnitude and resistance is essential for the two variable resistors; a seemingly linear variation in the skin color and the green intensity is then the result.

In this case the variation in the green intensity is based on the fact that the color points for red and blue are shifted in the same sense along the sides of the color triangle towards the green point and this is such a manner that the relative location of the color points remains substantially unchanged, but that the green intensity decreases. For the adjustment of the skin color the color points for blue and red are shifted in opposite senses on the side of the color triangle so that considerable variations in the range of the skin color reproduction occur but in which the white point is not influenced and also the green intensity remains substantially constant.

When $$R_2=2k\Omega, R_3=10k\Omega \left(\frac{R_2}{R_3}=0.2\right) \quad (42a)$$

is chose, then $$R_{10}=689\Omega-0.2079\,R_0,$$
$$R_4=473\Omega, \quad (42b)$$
$$R_{50}=12.265\,k\Omega.$$

is obtained.

It is assumed that $R_o'=R_o''=100\Omega$. In that case $$R_{10}=668\Omega, R_{1_{max}}=6.680\,k\Omega.$$

Furthermore there follows that $$\epsilon=0.0302,$$

resulting in:

$$-g\Big|_{max}=0.1873$$

and $$+g\Big|_{max}=0.3607.$$

Experience shows that a range of $-0.1 > g > +0.1$ is even sufficient.

Logarithmic potentiometers are essentially chosen for the two variable resistors. For $R_1$ normal adjustment is then obtained at half the function angle. Also the decrease in the intensity of the green is better adapted to a linear intensity impression by means of a logarithmic resistor.

The given exact exaggerated numerical values formally correspond to the Equations (35). In this case resistances of the standardized series of values can be used.

When incorporating the circuit arrangement according to FIG. 12 in a conventional transistorized color difference (FD)-amplifier, the — now variable — resistors do not exert influence on the output voltages $U_{(R-Y)E}$ and $V_{(B-Y)E}$. Thus the network must have resistors of comparatively great value. This necessitates inter alia the interposition of an inverter stage while simultaneously changing the structure of the (G—Y) stage.

FIG. 13 shows a circuit arrangement which is suitable as an intermediate stage for a receiver provided with integrated circuits; it includes two transistor amplifier stages of the conventional type for the G-signal. The color difference signals superimposed by direct voltages $U_0$ are available at the output of the integrated synchronous demodulator, which color difference signals are to be applied to the input of the integrated RGB-arrangement. The RGB-arrangement includes the preliminary stages for the three output amplifiers. The generator resistances are to be very low with respect to the resistances of the network, but on the other hand the input resistances of the RGB-arrangement should be high.

Since this concept for the receiver is formed without reintroducing the direct current components the direct voltages must also be transmitted exactly. The direct voltage for the G-signal input is restored by means of two transistors $T_1$ and $T_2$ one of which effects the required inversion of the signal.

In the circuit arrangement according to FIG. 13 there is still the difficulty that on the one hand the resistors $R_1$, $R_2$, $R_3$, $R_4$, $R_5$ should have a high value with respect to $R_0'$, $R_0''$, but on the other hand $R_0'$, $R_0''$ should have a high value with respect to the generator resistor on the (R—Y) side. Without restricting the g range to a too great extent it is still possible to admit approximately $\epsilon = 0.3$ in accordance with Equation (42). This leads approximately to $$R_2=2\,(R_o'+R_o''). \quad (43)$$

The smallest input resistance of the network occurring at the (R—Y) 1 l is for $R_1=0$, $R_5=0$.

$$R_i=R_0'+\frac{R_0''R_3R_4}{R_0''(R_3+R_4)+R^3R_4}$$

or with $$\frac{R_2}{R_3}=0.2 \quad (44)$$

$$R_i=(R_0'+R_0'')\,\frac{R_2+0.9210(R_0'+R_0'')}{R_2+3.1241(R_0'+R_0'')}$$

and with $$R_0'+R_0''=\frac{R_2}{2}$$

$$R_i\approx 0.3R_2.$$

If the generator resistance $R_G$ should be a factor of 20 smaller than $R_1$ then the condition applies that $$R_2 \geqq 70\,R_G.$$

For, for example, $R_G = 30\Omega$, $R_2$ becomes 2 $k\Omega$. Then there apply the above given numerical values for the resistances up to $R_{10}$; with $R_o' + R_o'' = 1\,k\Omega$, $R_{10}$ become 488Ω and $R_{1max}$ becomes 4.880 $k\,\Omega$.

If $$h_o=h\,(x=0), g_o=g\,(y=0)$$

is written then we obtain:

$$k_1=\frac{k_{10}(1-a_1h_0)-g_0+a_1h_0g_0}{1+\frac{1}{k_{20}}\,a_1h_0g_0} \quad (45a)$$

$$k_2=\frac{k_{20}(1-a_2h_0)+g_0-a_2h_0g_0}{1+\frac{1}{k_{20}}\,a_1h_0g_0} \qquad (45b)$$

Coupling terms occur with $h_0g_0$ so that the variations in the color of the skin and the green intensity are not completely independent of each other. If an independence is to be obtained of the adjustments at arbitrary values of $g$ and $h$ then the equations $$k_1=k_{10}(1-a_1h)-g,$$

$$k_2=k_{20}(1-a_2h)+g \qquad (46)$$

should be realized to which end the introduction of further active structural elements is required. However, for small variations the mutual dependence of the adjustments in the circuit arrangement of FIG. 12 is small anyway.

As essential simplification is obtained if a fixed reduction of the green intensity is chosen.

The circuit arrangement may then be formed in accordance with FIG. 14 wherein the second potential divider comprising resistors $R_2$ and $R_5$ in FIG. 11 and the sixth resistor $R_4$ as well as the output resistor $R_3$ are replaced by an equivalent fixed simple potential divider comprising the resistors $R_2$* and $R_3$*; the output signal from the terminal 3* is then derived from the junction of this potential divider and the variable resistor $R_1$.

For a given green intensity $Y_E$ (green) $= Y_E(G)$ there follows from the Equations (21), (27), (11) and (18) as well as (50) that:

$$k_1'=\left(k_{10}+\frac{\sigma_G-\sigma_B}{1-\sigma_B}\right)\left(\frac{Y_E(G)}{Y_{GE}}\right)^{1/\gamma}-\frac{\sigma_G-\sigma_B}{1-\sigma_B},$$

$$k_2'=\left(k_{20}+\frac{1-\sigma_G}{1-\sigma_B}\right)\left(\frac{Y_E(G)}{Y_{GE}}\right)^{1/\gamma}-\frac{1-\sigma_G}{1-\sigma_B}, \qquad (47)$$

and after introduction of the numerical values $$k_1'=0.9232\left(\frac{Y_E(G)}{Y_{GE}}\right)^{1/\gamma}-0.4134,$$

$$k_2'=0.7820\left(\frac{Y_E(G)}{Y_{GE}}\right)^{1/\gamma}-0.5866. \qquad (48)$$

A skin color adjustment is to be realized in which, while varying $g$, $$k_1=k_1'-g,$$

$$k_2=k_2'+g \qquad (49)$$

the network equations provide for the resistances $$R_{10}=\frac{k_2'}{k_1'}\,[1-(k_1'+k_2')]\,R_3^*-\frac{R_0'\cdot R_0''}{R_0'+R_0''} \qquad (50)$$

$$R_2^*=\frac{1-(k_1'+k_2')}{k_1'+k_2'}\,R_3^*, \qquad (50a)$$

$$\frac{R_0''}{R_0'+R_0''}=k_1'+k_2', \qquad (50b)$$

$R_3^*$ and $R_0'$, $R_0''$ can be chosen within certain limits. The resistor $R_1$ is written in the form of $$R_1=R_{10}(1+x)$$

with $$R_{1\,min}=R_1\Big|_{(x=-1)}=0$$

$$R_{1\,max}=R_1\Big|_{(x=9)}=10R_{10}.$$

Thus $$g=k_1'\,\frac{Ax}{1+Ax} \qquad (52)$$

with $$A=\frac{k_2'}{k_1'+k_2'}\left\{1-\frac{k_1'}{k_2'[1-(k_1'+k_2')]}\,\frac{R_0'R_0''}{(R_0'+R_0'')R_3}\right\} \qquad (52a)$$

To obtain resistors $R_0'$, $R_0''$ having a value which is as large as possible and simultaneously with a factor of $g$ for which the range is not too small we choose essentially $$\frac{R_0'\cdot R_0''}{R_0'+R_0''}=R_{10},$$

which then becomes $$R_{10}=\frac{k_2'[1-(k_1'+k_2')]}{2k_1'}\,R_3^*$$

$$R_2^*=\frac{1-(k_1'+k_2')}{k_1'+k_2'}\,R_3^*$$

$$R_0'=\frac{k_2'[1-(k_1'+k_2')]}{2k_1'(k_1'+k_2')}\,R_3^*$$

$$R_0''=\frac{k_2'}{2k_1'}\,R_3^* \qquad (53)$$

This makes it possible to ahieve the following adjusting range for g ($R_{1max}=10\,R_{10}$)

$$-g\Big|_{max}=\frac{k_1'k_2'}{2k_1'+k_2'}$$

$$+g\Big|_{max}=\frac{9k_1'k_2'}{11k_2'+2k_1'} \qquad (54)$$

The minimum occurring input resistance of the circuit arrangement at $R_1=0$ at the $R-Y$ input becomes $$R_{1\,min}\,\frac{k_2'[1-(k_1'+k_2')][2k_1'+k_2']}{2k_1'(k_1'+k_2')[2k_1'(1-(k_1'+k_2'))+k_2']}\,R_3^* \qquad (55)$$

The following Table gives numerical values for a few green intensities

| $Y_E(G)/Y_{GE}$ | 1.0 | 0.9 | 0.8 | 0.7 |
|---|---|---|---|---|
| $k_1'$ | 0.5098 | 0.4666 | 0.4208 | 0.3716 |
| $k_2'$ | 0.1954 | 0.1588 | 0.1200 | 0.0784 |
| $R_{10}/R_3^*$ | 0.0565 | 0.0637 | 0.0655 | 0.0580 |
| $R_2^*/R_3^*$ | 0.4180 | 0.5990 | 0.8491 | 1.2222 |
| $R_0'/R_3^*$ | 0.0801 | 0.1019 | 0.1211 | 0.1289 |
| $R_0''/R_3^*$ | 0.1916 | 0.1702 | 0.1426 | 0.1055 |
| $-g$/max | 0.082 | 0.068 | 0.053 | 0.036 |
| $+g$/max | 0.283 | 0.249 | 0.210 | 0.163 |
| $R_{1\,min}/R_3^*$ | 0.196 | 0.219 | 0.230 | 0.217 |

The $g$-range is sufficient. With the aid of the numerical values the proportioning of the circuit arrangement of FIG. 14 can be read for each fixed chosen reduction of the green intensity.

The source impedance for R–Y, B–Y is, for example, 50Ω and $R_{1\,min} = 20 \cdot 50 = 1\ k\Omega$. For adjusting $Y_E(G)_{GE} = 4.4$. a resistor $R_3^* > 4.4\ k\Omega$ is required. With $R_3^* = 5\ k\Omega$ the following resistances are obtained:

$$R_0'=606\Omega,\ R_0''=913,\ R_2^*=4.246\ k\Omega,$$

$$R_{10}=328\Omega,\ R_{1\,max}=10\,R_{10}=3.28\ k\Omega.$$

CIRCUIT ARRANGEMENT FOR CORRECTIONS AT THE TRANSMITTER END

In the foregoing the principle and the circuit arrangements were described by which an adjustment of the skin color reproduction and/or the green intensity is possible at the receiver end in the matrix for the color difference signals. A simple adjusting possibility at the transmitter end is obtained if the color signals $U_{RS}$, $U_{GS}$ and $U_{BS}$ provided by the camera are utilized and if one starts from the Matrix (14).

The so-called luminance signal is formed in the transmitter from the γ-corrected signals $U_{RS}$, $U_{GS}$, $U_{BS}$.

$$U_{YS} = Y_{RS}U_{RS} = Y_{GS}U_{GS} + Y_{BS}U_{BS} \quad (56)$$

and this is used for generating the signals $$U_{(R-Y)S} = U_{RS} - U_{YS},\ U_{(B-Y)S} = U_{BS} - U_{YS}. \quad (57)$$

The result for the coefficients in formula (56) is $$Y_{RS} = Y_{RSo} + Y_{GSo}\,\beta_1\,h_s + Y_{GSo}\,g_s, \quad (58)$$

$$Y_{GS} = Y_{GSo}\,(1 - h_s),\ (\beta_1 + \beta_2 = 1) \quad (59a,b)$$

$$Y_{BS} = Y_{BSo} + Y_{GSo}\,\beta_2\,h_s - Y_{GSo}\,g_s. \quad (60)$$

If it is assumed that the strict NTSC-coding is provided at the receiver end with $$U_{(G-Y)E} = -k_{1o}\,U_{(R-Y)E} - k_{2o}\,U_{(B-Y)E}, \quad (61)$$

(compare Formula (33)), then $$\begin{pmatrix} U_{RE} \\ U_{GE} \\ U_{BE} \end{pmatrix} = \begin{pmatrix} 1 & 0 & 0 \\ \beta_1 h_s + g_s & 1 - h_s & \beta_2 h_s - g_s \\ 0 & 0 & 1 \end{pmatrix} \begin{pmatrix} U_{RS} \\ U_{GS} \\ U_{BS} \end{pmatrix} \quad (62)$$

This corresponds to the Equations (21) in connection with the Equations (29). The factor $g_s$ is again responsible for the variation in skin color. The factor $h_s$ is responsible for the decrease in the intensity of the green. With respect to the Equations (21) we obtain for:

$$\beta_1 = \frac{\sigma_g - \sigma_B}{1 - \sigma_B} = 0.4134 \quad (63a)$$

$$\beta_2 = \frac{1 - \sigma_G}{1 - \sigma_B} = 0.5866 \quad (63b)$$

for the skin color constant at $x_H = 0.405$, $y_H = 0.360$. In the Equations (18) $\sigma_G$, $\sigma_B$ were indicated for the color picture tube A 63–11 X. For the strict NTSC-valences, which must now be given as a basis, slightly different values are the result namely (again for $\gamma = 2.2$)

$$\sigma^*_G = 0.7997, \quad (64a, b)$$

$$\sigma^*_B = 0.6387$$

and hence $$\beta_1 = 0.4457,$$

$$\beta_2 = 0.5543. \quad (65a, b)$$

FIG. 15 shows a principle circuit arrangement. In this circuit arrangement the coefficients of Equation (26) are split up in three parts, namely

| | 1 | 2 | 3 | |
|---|---|---|---|---|
| $Y_{RS} =$ | $Y_{RSo}$ | $+Y_{GSo}\,\beta_1\,h_s$ | $+Y_{GSo}\,g_s$ | |
| $Y_{GS} =$ | $Y_{GSo}$ | $-Y_{GSo}\,h_s$ | O | |
| $Y_{BS} =$ | $Y_{BSo}$ | $+Y_{GSo}\beta 2\,h_s$ | $-Y_{GSo}\,g_s$ | (66) |

For the first part the network including $R_{11}$, $R_{12}$, $R_{13}$, $R_{14}$ becomes active and there must apply that $$\frac{R_{11}}{R_{14}} = \frac{V_1 - 1}{Y_{RS0}} = 3.3445(V_1 - 1), \quad (67a)$$

$$\frac{R_{12}}{R_{14}} = \frac{V_1 - 1}{Y_{GS0}} = 1.7053(V_1 - 1), \quad (67b)$$

$$\frac{R_{13}}{R_{14}} = \frac{V_1 - 1}{Y_{BS0}} = 8.7260(V_1 - 1). \quad (67c)$$

The amplifier employing the amplification $V_1$ provides the normal NTSC coding as used up till now.

The second part is formed through a difference amplifier employing the amplification $V_2$.

The calculation results in:

$$\frac{R_{15}}{R_{17}} = \frac{V_2 - Y_{GS0}h_s}{Y_{GS0}\beta_1 h_s} \quad (68a)$$

$$\frac{R_{16}}{R_{17}} = \frac{V_2 - Y_{BS0}hs}{Y_{BS0}\beta_2 h_s} \quad (68b)$$

and if $V_2$ is chosen to be $mh_S$ (69)

$$\frac{R_{15}}{R_{17}} = \left(\frac{m - Y_{GS0}}{Y_{GS0}}\right)\frac{1}{\beta_1} = 3.8262m - 2.2437, \quad (70a)$$

$$\frac{R_{16}}{R_{17}} = \left(\frac{m - Y_{GS0}}{Y_{GS0}}\right)\frac{1}{\beta^2} = 3.0765m - 1.8041 \quad (70b)$$

These are necessary constant values. The green intensity can be reduced by means of the amplification $V_2$ (for example, through remote control).

The third part is likewise generated by means of a difference amplifier, its amplification is to render a polarity reversal of the voltage possible at zero crossing. If $$V_3 = Y_{GSo}\,g_s = 0.5864\,g_s \quad (71)$$

is chosen, the color of the skin can be corrected by means of $V_3$ (for example, likewise through remote control).

All three output voltages are added together. The result is the desired transmitter luminance signal.

The amplifications $V_1$, $V_{2\,max}$, $|V_3|_{max}$ need not be chosen to be high, for example, $V_1 = 2$, and $V_{2\,max} = 1$ with $m = 2$, $|V_3|_{max}$ need be not more than 0.1 . . . 0.2. This is efficient for a useful range of corrections.

What is claimed is:

1. A transmitting circuit for red, green, and blue color signals comprising means for producing from said color signals a luminance signal; means for modifying said luminance signal by applying adjustably equal amplitude and opposite polarity signals proportional to said red and blue signals to said luminance signal; and matrix means for forming red and blue color difference signals from said red, blue, and luminance signals; whereby the color of skin can be changed without changing the intensity of said green color signal or white point.

2. A circuit as claimed in claim 1 wherein said matrix means comprises amplifier means for producing a signal that is the difference between said red and blue color signals, said signal being adjustable in magnitude and sign and; means for applying said difference signal to said luminance signal.

3. A circuit for receiving luminance, and red and blue color difference signals comprising matrix means for producing from said signals a green color difference signal; means for modifying said green color difference signal by applying thereto equal amplitude and opposite polarity red and blue color difference signals, whereby the color of skin can be changed without changing the white point or the green color intensity.

4. A circuit as claimed in claim 3 wherein said matrix comprises a potential divider comprising a first resistor coupled to receive said red color difference signal, and a second resistor coupled to ground and to said first resistor; a second potential divider comprising a third fixed resistor coupled to receive said blue color difference signal, and a fourth resistor coupled to ground and to said third resistor; a third potential divider comprising a fifth variable resistor coupled to the junction of said first and second resistors, and a sixth resistor coupled to the junction of said third and fourth resistors and to said fifth resistor; and an output resistor means coupled to ground and to the junction of said fifth and sixth resistors for providing said green color difference signal; whereby for a given value of the third resistor and a nominal adjustment for the reproduction of the skin color and the green color intensity the normal values of the remaining potential divider and output resistors are proportioned as follows:

$$R_4 = k_{20}(A-1)R_2 \text{ with } A = \frac{a_2}{a_1} = \frac{4.0020}{1.8109} = 2.21,$$

$$R_1 = R_{10} = P \cdot R_2 = Q \cdot (R_0' + R_0'')$$

with $$P = \frac{k_{20}(k_{20}A + K_{10})}{k_{10}\left[1 + k_{20}(A-1)\frac{R_2}{R_3}\right]}$$

and $$Q = (k_{10} + k_{20})[1 - (k_{10} + k_{20})]$$

$$R_0' + R_0'' < \frac{P}{Q} \cdot R_2$$

$$\frac{R_0''}{R_0' + R_0''} = k_{10} + k_{20}$$

$$R_3 > \frac{(k_{10} + K_{20})[k_{20}(A-1) + 1]}{1 - (k_{10} + k_{20})} R_2$$

$$R_5 = R_{50} = \frac{k_{10} + k_{20}}{1 - (k_{10} + k_{20})}$$

$$\frac{.1 + k_{20}(A-1) \cdot \frac{R_2}{R_3}}{1 - \frac{k_{10} + k_{20}}{1 - (k_{10} + k_{20})}[k_{20} \cdot (A-1) + 1] \cdot \frac{R_2}{R_3}} R_2$$

Whereby the fifth resistor can be varied for varying the color of the skin.

5. A circuit as claimed in claim 4 wherein said fifth resistor is variable between a value which is small relative to the normal value and a value which is at least equal to 10 times the normal value.

6. A circuit as claimed in claim 4 wherein said fifth resistor is logarithmically variable.

7. A circuit as claimed in claim 4 wherein the luminance of the green color signal comprises a fixed value and said second potential divider, said sixth resistor and said output resistor comprise an equivalent fixed potential divider.

8. A transmitting circuit for first, second, and third color signals comprising means for producing from said color signals a luminance signal; means for subtracting from said luminance signal an adjustable amplitude signal proportional to said third color signal; means for adding to said luminance signal different fractions of two signals that are proportional to said adjustable amplitude signal and to said first and second color signals respectively; and matrix means for producing first and second color difference signals from said luminance and said first and second color signals respectively; whereby the intensity of said third color can be varied without changing skin color or the white point.

9. A circuit as claimed in claim 8 wherein said fractions are computed from:

$$B_1 : B_2 : 1,$$

$$B_1 + B_2 = 1,$$

and $$B_2 = \frac{1 - S_G}{1 - S_B},$$

wherein $B_1 + B_2$ are proportional to said fractions, $S_G = 0.7997$, and $S_b = 0.6387$.

10. A circuit for receiving luminance and red and blue color difference signals comprising matrix means for producing a green color difference signal from said received signals; and means for adding to said green color difference signal different proportions of said red and blue color difference signals, whereby the green intensity can be reduced without changing skin color or the white point.

* * * * *